United States Patent
Ekberg

(10) Patent No.: US 7,735,416 B2
(45) Date of Patent: Jun. 15, 2010

(54) APPARATUS, SYSTEM, AND METHOD FOR PORTABLE CAMP COOKER WITH ATTACHMENTS

(76) Inventor: Lane A. Ekberg, 7135 Ponderosa Dr., Salt Lake City, UT (US) 84121

( * ) Notice: Subject to any disclaimer, the term of this patent is extended or adjusted under 35 U.S.C. 154(b) by 0 days.

(21) Appl. No.: 11/944,584

(22) Filed: Nov. 23, 2007

(65) Prior Publication Data

US 2008/0156199 A1    Jul. 3, 2008

Related U.S. Application Data

(60) Provisional application No. 60/867,037, filed on Nov. 22, 2006.

(51) Int. Cl.
*A47J 37/06* (2006.01)
*F24B 3/00* (2006.01)

(52) U.S. Cl. .............. 99/380; 99/449; 99/421 H; 99/421 R; 99/441; 99/394; 126/30

(58) Field of Classification Search ........... 99/380, 99/449, 421 H, 421 R, 441, 394; 126/30
See application file for complete search history.

(56) References Cited

U.S. PATENT DOCUMENTS

| | | | | |
|---|---|---|---|---|
| 2,912,973 | A | 11/1959 | Lucas | 126/30 |
| 2,914,283 | A | 11/1959 | Jorgensen | 248/125 |
| 3,067,734 | A | 12/1962 | Lucas | 126/30 |
| 3,152,536 | A | 10/1964 | Lucas | 99/397 |
| 4,094,296 | A | 6/1978 | Beagley | 126/30 |
| 4,538,589 | A | 9/1985 | Preston | 126/30 |
| 4,539,751 | A * | 9/1985 | Chan | 30/322 |
| 4,607,608 | A | 8/1986 | Allred et al. | 126/30 |
| 4,854,297 | A | 8/1989 | Shuman | 126/30 |
| 4,856,423 | A | 8/1989 | Burns | 99/421 |
| 4,979,490 | A * | 12/1990 | Nudo et al. | 126/30 |
| 5,117,558 | A * | 6/1992 | Hull | 30/323 |
| 5,297,534 | A | 3/1994 | Louden | 126/30 |
| 5,307,797 | A | 5/1994 | Kleefeld | 126/30 |
| 5,862,742 | A | 1/1999 | Bjerg | 99/449 |
| 6,701,827 | B1 * | 3/2004 | Longbrake | 99/441 |
| 2005/0109761 | A1 * | 5/2005 | Little et al. | 219/438 |
| 2006/0112950 | A1 | 6/2006 | Czajkoski | 126/30 |

FOREIGN PATENT DOCUMENTS

DE  202005011593    *  5/2005
DE  202005011593 U1    11/2005

* cited by examiner

*Primary Examiner*—Shawntina Fuqua
(74) *Attorney, Agent, or Firm*—Kunzler Needham Massey & Thorpe

(57) ABSTRACT

A portable cooking apparatus is light, packable, compatible with back-country hiking, and is multi-functional for use over a heat source. An arm of the apparatus may elongate and shorten and may have an attachment system on the arm that allows the attachment of a plurality of food and drink holding attachments. The attachments may be coupled to a strap connected to a handle. The handle may include a compartment for holding parts of the apparatus or other articles so that the apparatus may be disassembled and stowed. A rotisserie mode enables rotation of food over an open flame. A rotisserie handle can be releasably coupled to the apparatus handle. The rotisserie handle can be placed in a locked condition to prevent rotation in a variety of cooking positions. A pivoting arm stabilizer enables cooking food to be horizontally pivoted to and from the heat source.

20 Claims, 11 Drawing Sheets

APPARATUS, SYSTEM, AND METHOD FOR PORTABLE CAMP COOKER WITH ATTACHMENTS

CROSS-REFERENCES TO RELATED APPLICATIONS

This application claims priority to U.S. Provisional Patent Application No. 60/867,037 entitled "PORTABLE CAMP COOKER WITH ATTACHMENTS" and filed on Nov. 22, 2006 for Lane A. Ekberg, which provisional application is incorporated herein by reference.

BACKGROUND OF THE INVENTION

1. Field of the Invention

This invention relates generally to cooking equipment, and more specifically for cooking equipment used over heat sources outside of the home.

2. Description of the Related Art

Cooking utensils have been used for hundreds, if not thousands, of years and are still heavily used today. There are cooking utensils that are used by outdoor enthusiasts and those looking for a hot cooked meal where conventional ovens, gas fuel and electric power devices are not available. Some of these utensils have proven to be useful when backpacking, camping, or being far away from the usual utilities that cook food and boil water.

Camp cooking utensils offer a variety of cooking experiences. There are millions of people world wide who enjoy camping in the outdoors and getting closer to nature. In the process of camping outdoors in remote areas of the planet camping enthusiasts heat their food with a variety of camp fire oriented products such as a handled cooking iron to name one. A cooking iron or the like commonly consists of two long handles and usually two food encompassing portions pivoting on an axis allowing the two portions to open and close. These types of cooking devices have been used for centuries. Unfortunately however for such campers the current state of the art only provides cooking irons and the like that have very limited adjustability and flexibility in the ways that they can be used.

Thus, there is a need for a camp cooker with greater flexibility and adjustability.

SUMMARY OF THE INVENTION

Unfortunately however, for such campers the current state of the art only provides cooking irons and the like that have fixed non-adjusting handles for inconvenient packing. Also, the handle cannot be adjusted to fit a custom distance of the user's hand from the portions of the camp cooker that hold the food. There is a deficiency of attachment features for cooking a wide variety of food in past devices. This is a disadvantage for people who enjoy cooking in the outdoors and who like hiking with a back pack in which space is limited.

A solution to the current space-wasting camp cookers and camp cookers with minimal adjustability is a camp cooker that enables at least two configurations wherein the handle or handles of the camp cooker retract forming a more compact device, and a configuration in which the handle or handles can be increased in length to length suitable for a proper cooking distance. This distance may correspond approximately to a distance found on traditional non-portable camp cookers and cooking irons. What is needed is an adjustable camp cooker which retracts or which can be shortened in length to make the camp cooker more compact so that it cam more easily be fit on or in packing devices and take up less space. When the camp cooker is ready to be used the arm or arms can quickly be lengthened and the device can be held over heat with the user at a comfortable distance corresponding to the length of the arm or arms. Also needed, is a attachment mechanism allowing different irons and cooking devices to be changed out for different cooking applications.

The present invention is in response to the above stated needs and to overcome the deficiencies of the current state of the art. In particular, embodiments of the present invention are in response to the problems and needs in the art that have not been fully solved by current available camp cookers, pie irons, grills, and anything that cooks with opening and closing portions held over a fire or other heat source.

Accordingly, the present invention has been developed to provide a cooking device that is a portable grilling device for cooking over a heat source. The device may include at least one horizontally extending positional arm changeable between a shorter setting and a longer setting. The device may also include an adapter portion on the positional arm that accepts a plurality of releasably coupled food attachments. In one embodiment, the positional arm is adapted to accept removably coupled attachments. In some embodiments, the device is part of a camp cooker system that includes one or more attachments from a group comprising a sandwich sealing crust remover, a pot, a fork, a grill, a pie iron, and a Dutch oven. The attachments may be removably attachable to the at least one arm. In one embodiment, the device includes a handle adapted to be coupled to the at least one arm. The handle may have a compartment to hold the arm for easy compact storage.

In another embodiment, the invention is directed to a portable grilling device for preparing food over a heat source in which the device includes at least one stabilizing assembly supporting the positional arm. The stabilizing assembly may have a pivot with an axis generally aligned with a longitudinal axis of the positional arm. The stabilizing assembly may include stabilizing arms for engagement on a supporting surface, an arm retainer, and an additional pivot coupling the arm retainer to the stabilizing arms. The additional may be on an axis that is transverse to the first axis.

In still another embodiment, the invention is directed to a portable grilling device for preparing food over a heat source in which the device has at least one positional arm with a proximal end and a distal end. A handle may be removably attached to the proximal end of the positional arm. An arm retainer may rotatably support the positional arm for rotation generally about a first longitudinal axis of the positional arm. At least one attachment may be removably attached to the distal end of the positional arm. The handle may include a rotisserie handle.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one of the embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and the appended claims, or may be learned by the practice of the invention as set forth hereinafter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
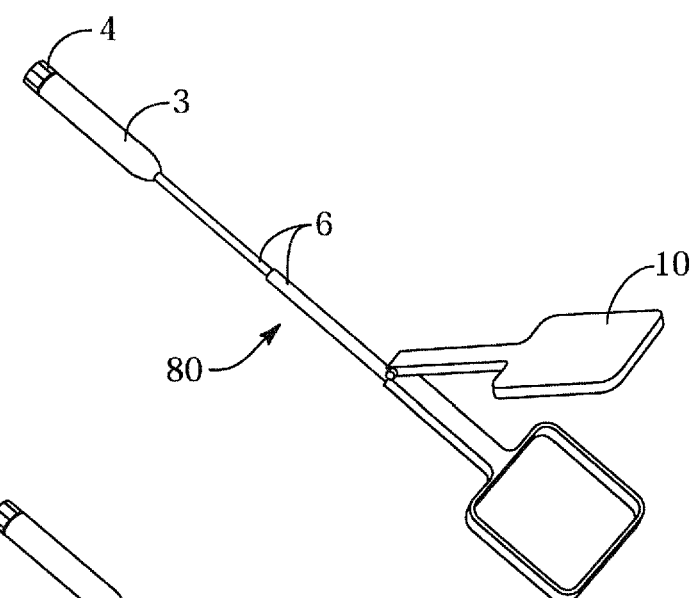
FIG. 1A is a perspective view illustrating one embodiment of the campfire cooking device in an open condition in accordance with the present invention.
Figure 1B:
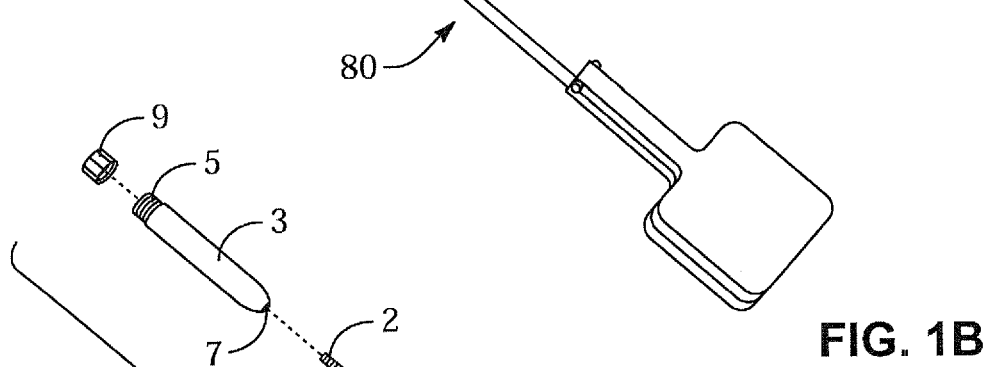
FIG. 1B is a perspective view showing the campfire cooking device of FIG. 1A in a closed condition.
Figure 1C:
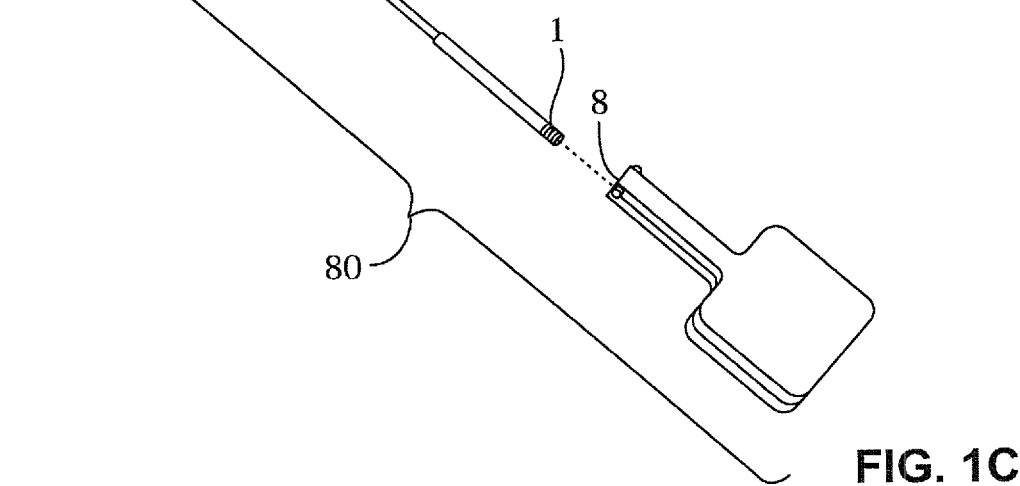
FIG. 1C is an exploded view of the campfire cooking device of FIGS. 1A and 1B.

FIGS. 1A-1C are a diagrammatic perspective views illustrating one embodiment of a portable camp grill 80. In the exploded view of FIG. 1C, structure for putting handle 3 and thread 2 together enables the handle 3 to be coupled to the telescoping arm 6. Similarly, threads 1 of the telescoping arm 6 engage opening 8 of a food cooking device allowing the telescoping arm 6 to be coupled to any of a plurality of food holding and liquid preparing devices that can then be held over a camp fire or open flame.

The handle cap 9 is coupled to the handle by a thread mechanism including external handle threads 5 on the handle 3. Internal handle threads 7 engage telescoping arm threads 2 enabling the two to parts or components to be joined to one another forming a handled arm with a handle. Thus, a camp grill system can be disassembled to a compact size by uncoupling the handle 3, telescoping arm 6, and one of the food holding devices 8.

Figure 2:
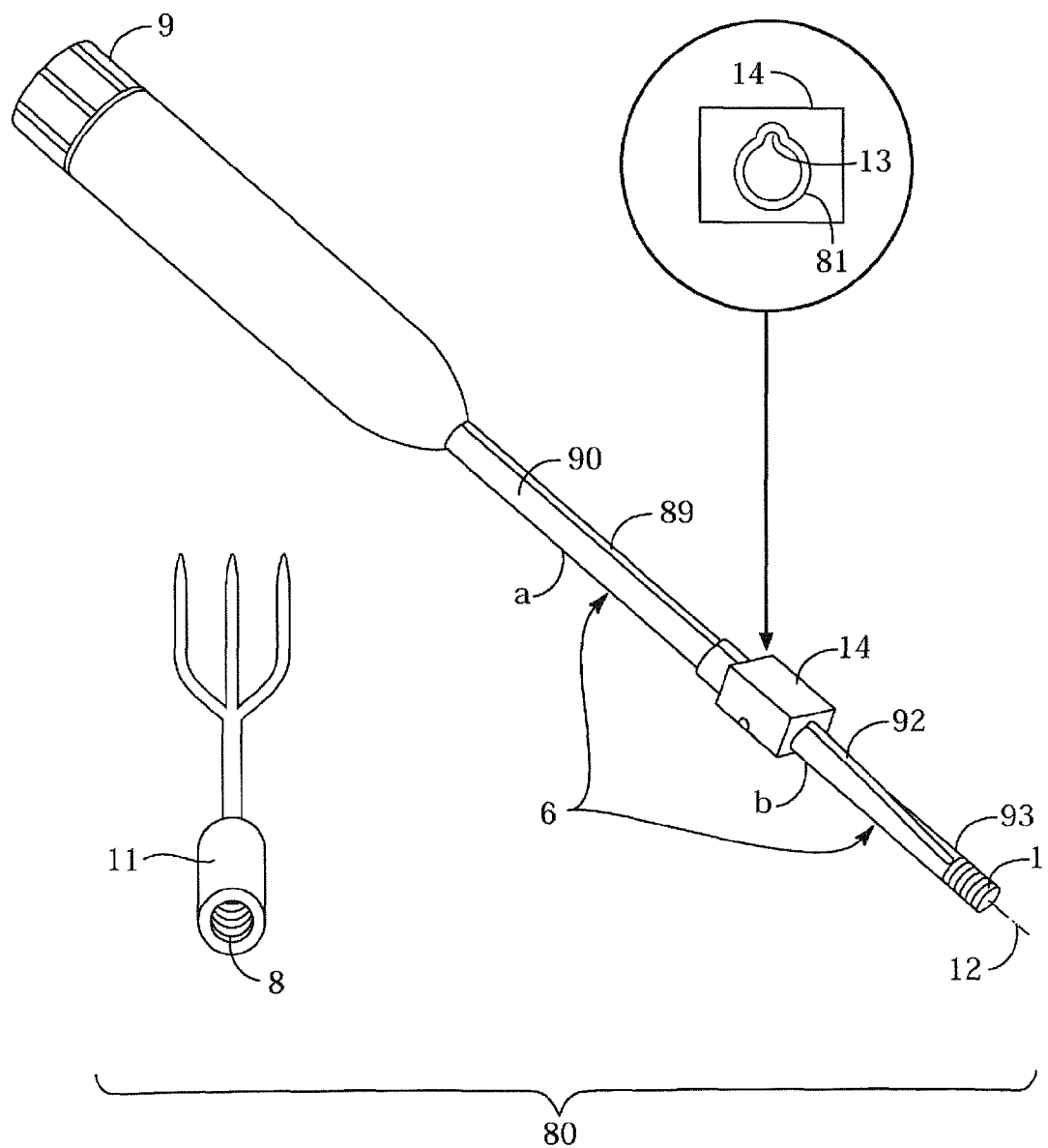
FIG. 2 is a perspective view illustrating one embodiment of the campfire cooking device in accordance with the present invention.

FIG. 2 is a diagrammatic perspective view illustrating a stabilizer 14 with an arm retention hole 81 having a keyway 13 or other structure for inhibiting rotational movement about a longitudinal axis 12. These structures work together to provide a mechanism that enables a user to let go of the handle 3 and the camp grill 80 will stay steady. A protrusion 89 or other uneven configuration on a cylinder 90 of the telescoping arm 6 inhibits rotation about the longitudinal axis 12 of the arm 6 in a cylinder 93. Similarly, a protrusion 92 or other uneven structure on the cylinder 93 inhibits rotation of the outer cylinder relative to the stabilizer 14. The structures may include protrusions in the form of keys or ribs and corresponding keyways that enable relative axial movement while inhibiting rotational movement except for slight rotational movement. In one embodiment, one or more of the keys may extend along a cylinder in a helical configuration to enable gradual rotation of the stabilizer 14. For example, as the stabilizer 14 moves longitudinally along the bead 92, the bead causes gradual rotation of the stabilizer 14 about the longitudinal axis 12. Food cooking fork 11 may be attached by threads 8 to threads 1 similar to the attachment shown in FIGS. 1A-1C such that the fork 11 is removably coupled to the arm 6. The two moving portions "a" and "b" of 6 move in and out of each other lengthening and shortening to the desired position. The structure on the cylinders 90, 93 may additionally or alternatively have a helical structure. The handle cap 9 can be removed by twisting of the handle threads 5.

Figure 3:
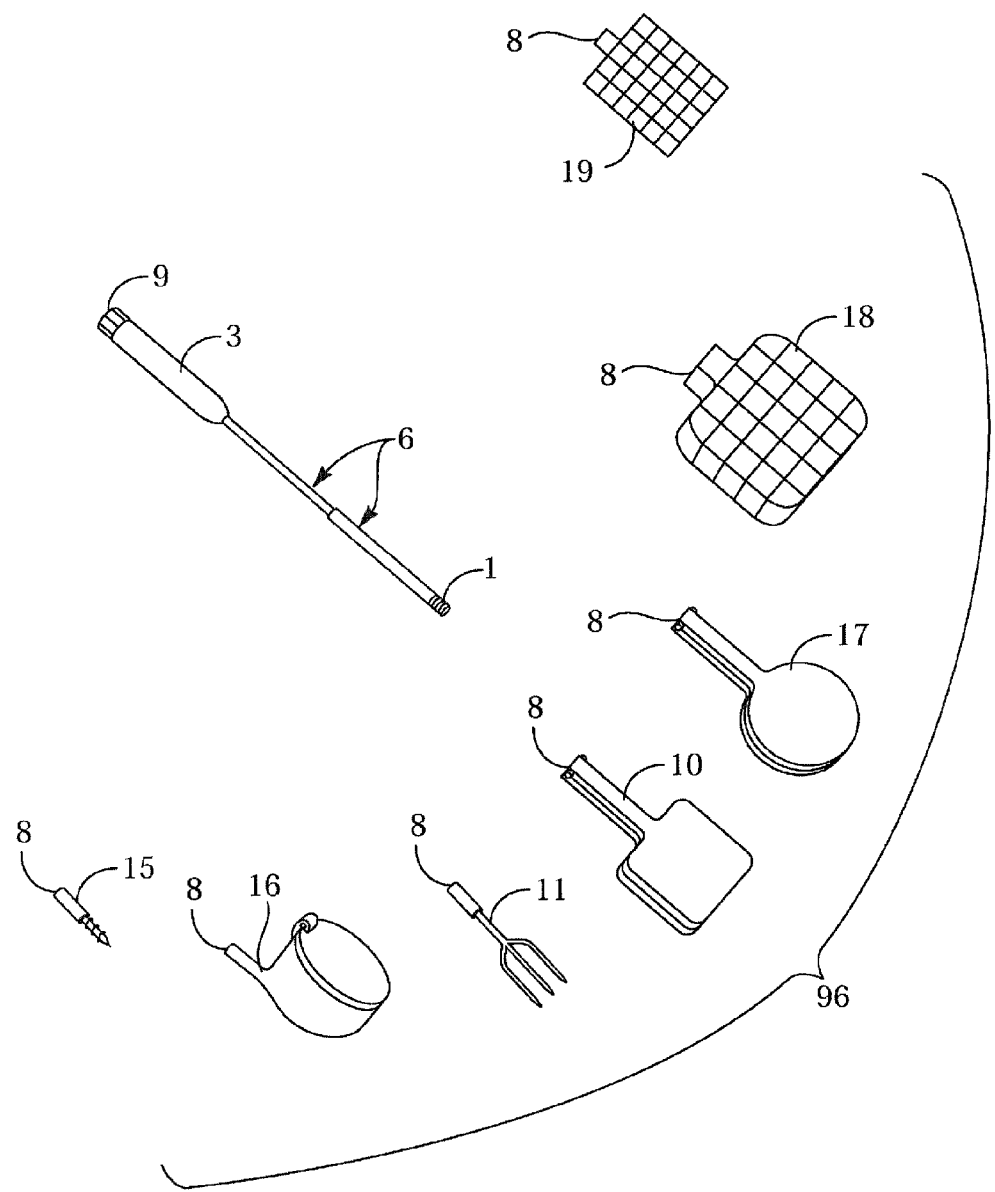
FIG. 3 is a perspective view illustrating several cooking attachments usable with the campfire cooking device in accordance with the present invention.

FIG. 3 is a diagrammatic perspective view showing many food and liquid holding attachments that can be removably coupled to the arm 8 of a camp grill system 96. The removable coupling system allows for complete customization for cooking anything the user desires. Any number of food attachments can be made to removably couple to the telescoping arm. Some examples of food attachments include a corn screw 15, pot 16, fork 11, smore holder 10, pie iron 17, food holder grill 18, and flat grill 19. These and/or other attachments with their respective attachment threads 8 are configured to screw onto threads 1 without limitation.

Figure 4:
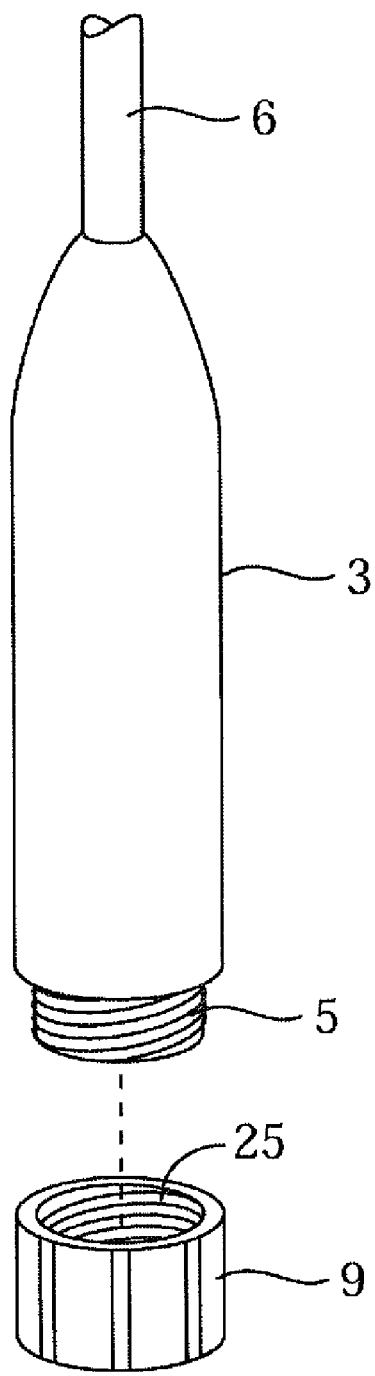
FIG. 4 is a perspective view illustrating one embodiment of a handle in accordance with the present invention.

FIG. 4 is an exploded view showing a handle system 99 of the handle 3 in greater detail. The handle 3 may be made out of wood, plastic, or any material that is flame and heat repelling. The handle cap 9 has grip built in its surface enabling the user to more easily grip and turn the cap 9. An interior of the handle 3 has space that receives the telescoping arm 6 when retracted. A telescoping arm that fits inside the handle enables a very compactable camp grill 80 and overall system 96, as well as a compactable cooking arm.

Figure 5A:
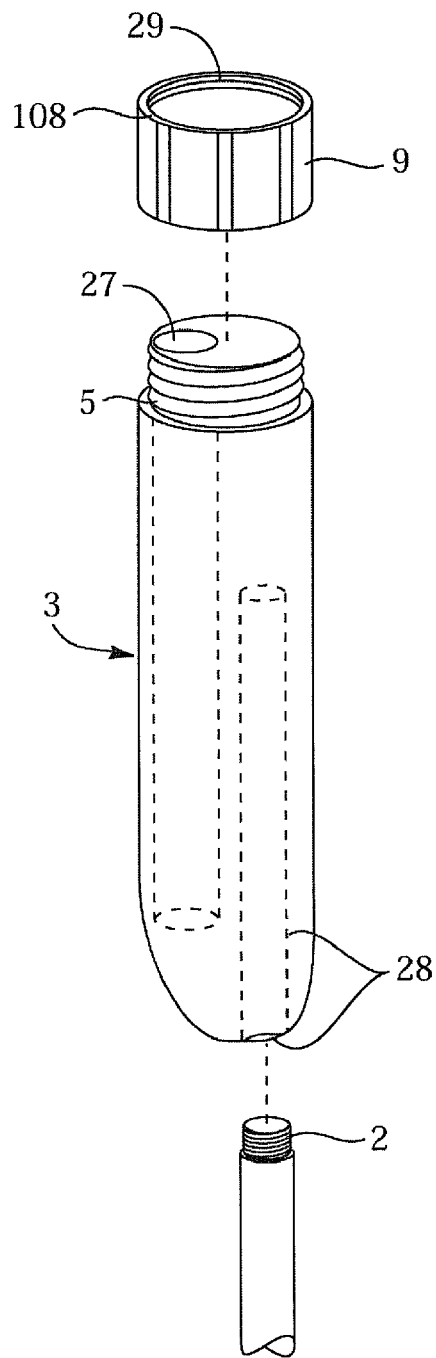
FIG. 5 is an exploded perspective view illustrating further embodiments of the handle in accordance with the present invention.
Figure 5B:
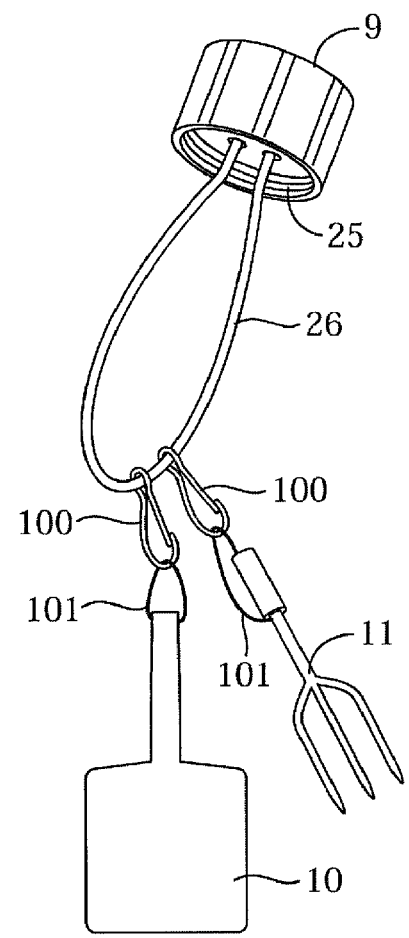
Figure 6:
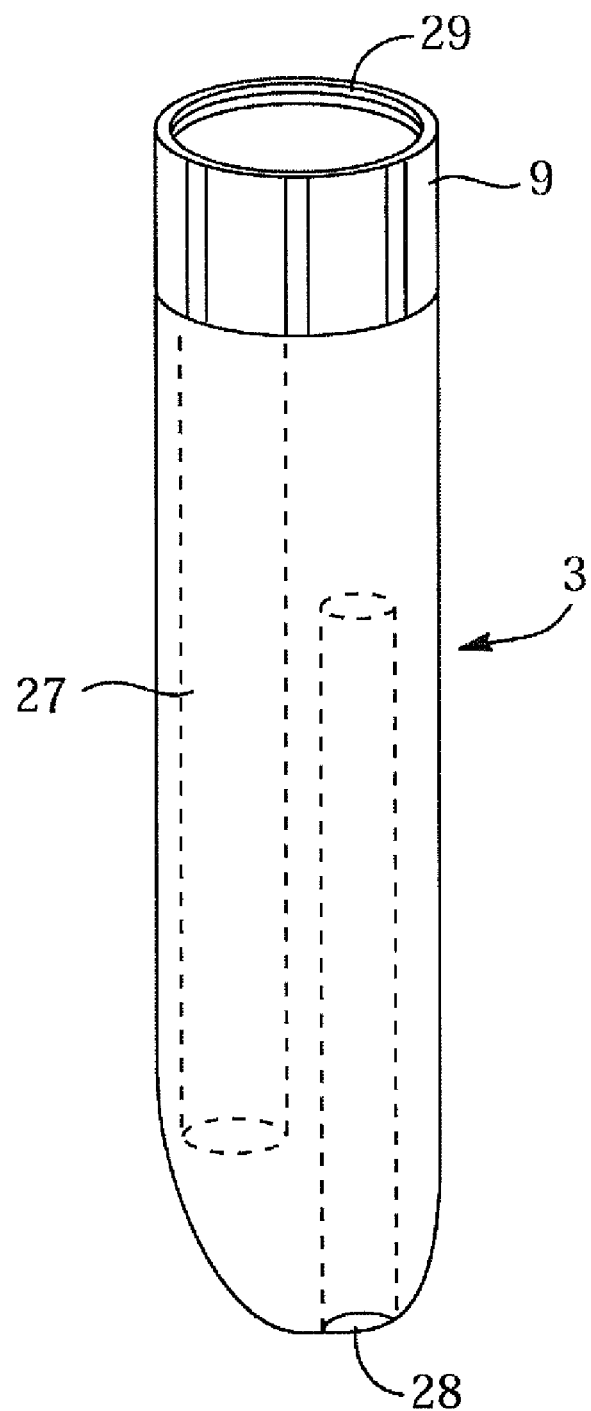
FIG. 6 is a perspective view illustrating another embodiment of the handle and its storage compartments in accordance with the present invention.

FIG. 5A-6 are further diagrammatic perspective views of the handle 3 in accordance with embodiments of the present invention showing the arm compartment 27 in which the telescoping arm 6 may be stored when the camp grill 80 is packed away. The handle cap 9 may be reversed allowing a handle cord 26 to be utilized for retaining objects associated with the camp grill including any cooking attachment. For example, clips 100, and loops 101 may be used to couple the attachments 10 and 11 to the strap 26. Any number and variety of attachments and other objects may be coupled in this manner. Alternatively, the strap 26 may be formed of a bungy material, and one or more attachments and other objects may be strapped to the handle by wrapping the strap around the handle (3), the attachment(s), and any other object(s). When not in use, the handle cord 26 may be pushed inside an interior of the cap 9, as may be appreciated from FIG. 5A. To deploy the handle cord 26, the cap 9 may be turned over and the cord may be drawn through holes 29. Handle interior threads 28 enable the telescoping arm 6 to be attached to the handle 3 through a screwing action with telescoping arm threads 2. The threads 25 enable attachment of the handle cap 9 to the rest of the handle 3. Similar threads 102 may be placed on a lip 105 around an upper edge 108 of the cap 9 such that either of two ends of the cap 9 may be coupled to the rest of the handle 3 in either of the regular and reversed configurations. The cap threads 29 enable an embodiment having a rotisserie handle attachment, as will be described below.

Figure 7:
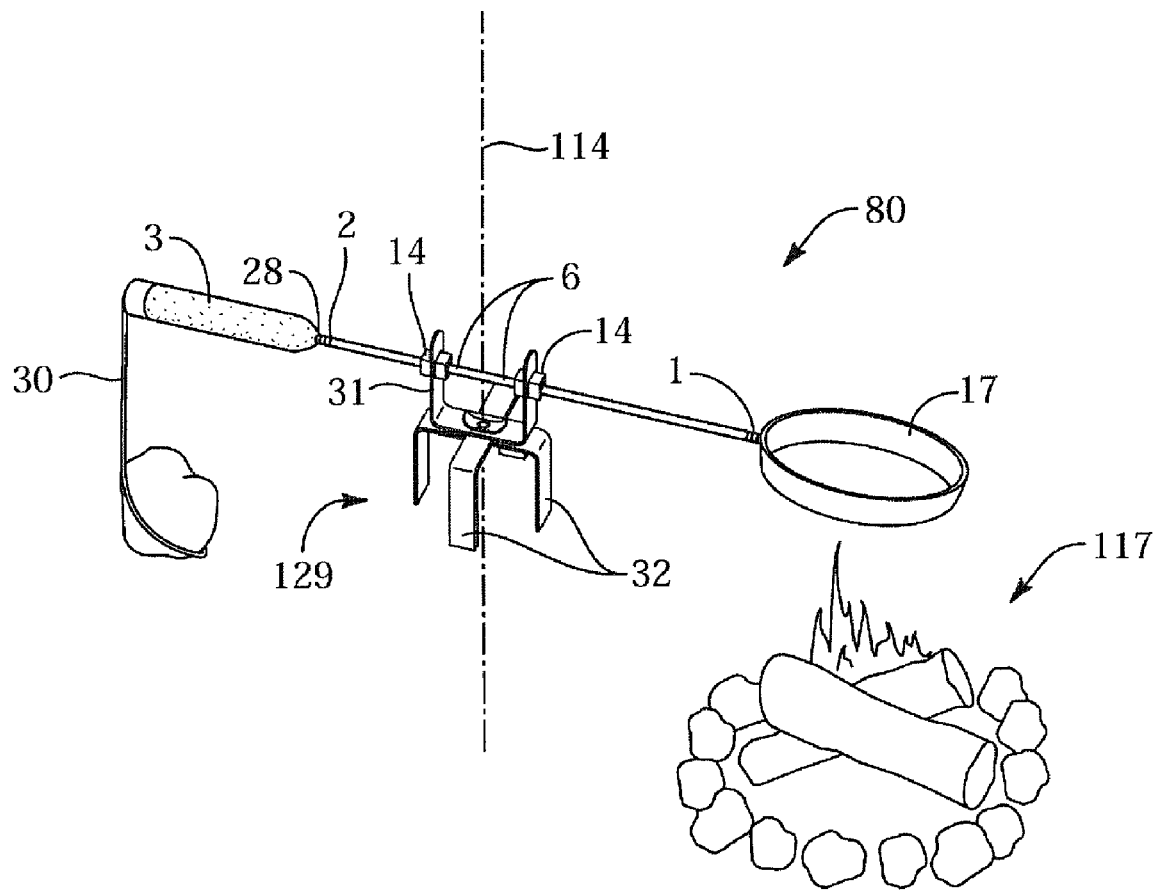
FIG. 7 is a perspective view of another embodiment in accordance with the present invention.

FIG. 7 is a perspective view of a system and method that incorporates several embodiments of the present invention including a weight cord 30 to which a heavy object 111 may be tied so that too much weight in a cooking device (pan 17 shown) will be counter balanced. Another embodiment is the pivoting arm retainer system which includes an arm retainer 31 that enables the arm 6 to be rotated rotisserie style or fixed to inhibit movement within the grasp of the arm retainer 31. The stabilizer 14 may be fitted in an opening of the arm retainer 31 to receive the arm 6 in a fixed condition, as will be described in greater detail below. The stabilizer 14 is moved from a position within the opening when the rotisserie function is needed. The stabilizer 14 can then be moved back into the opening and function in the position within the opening to prevent or inhibit the telescoping arm 6 from having rotational movement. Base stabilizing arms 32 are pivotally connected to the arm retainer for relative rotation about a generally vertical axis 114 during use. The stabilizing arms 32 are adapted to support the camp grill 80 on the ground near a heat source such as a camp fire 117, and also to add a pivoting means horizontally about the axis 114 on and off the heat source. The telescoping arm 6 can also telescope horizontally on and off the heat source.

Figure 8:
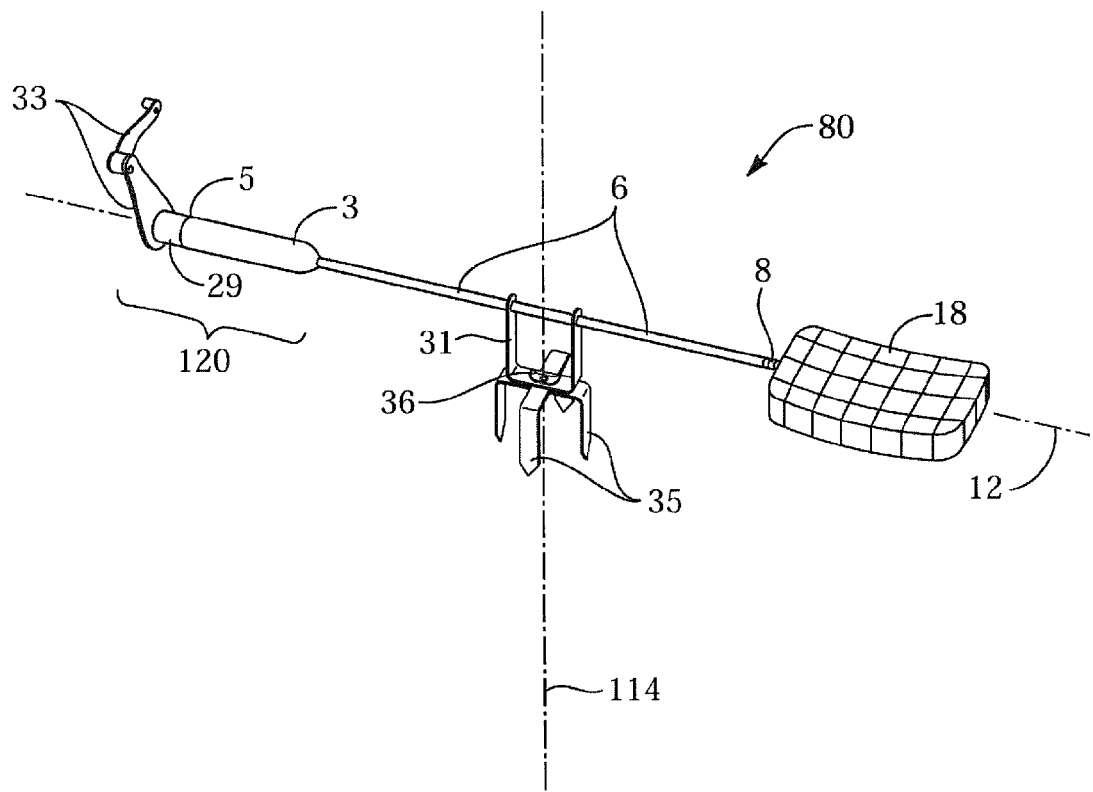
FIG. 8 is a perspective view showing an embodiment of a campfire cooking device in a rotisserie mode in accordance with the present invention.
Figure 9:
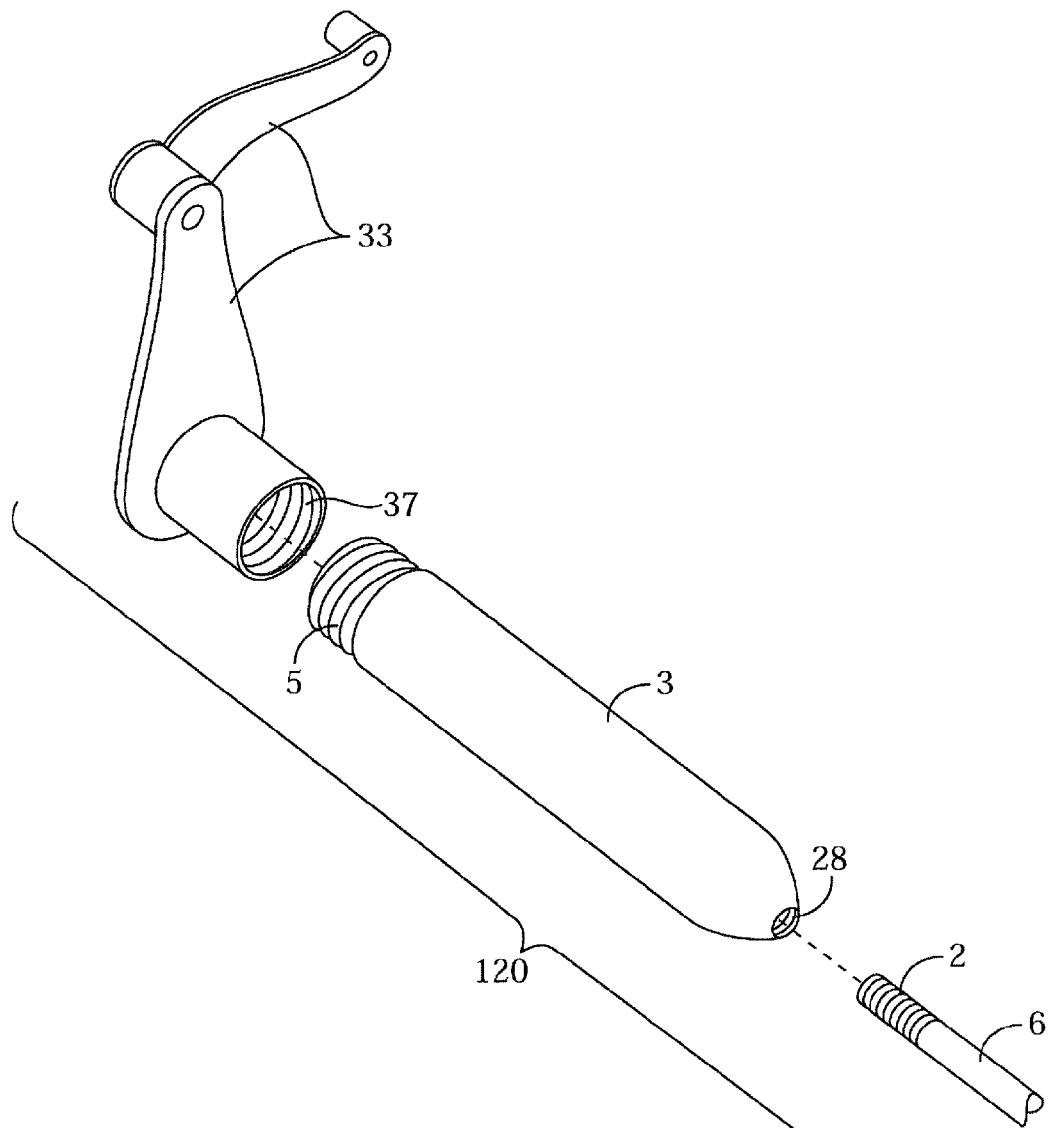
FIG. 9 is an exploded perspective view of a portion of the campfire cooking device of FIG. 8 and illustrating the rotisserie turn handle in greater detail.

FIGS. 8-9 are top perspective views of the camp grill 80 or a portion of the camp grill illustrating a rotisserie configuration. In FIG. 8 a rotisserie handle 33 mounts to the handle 3. The handle cap 9 can be removed by unscrewing the handle cap 9 relative to the handle threads 5 and disoccupying the handle threads 5, as shown in FIG. 8. This allows the rotisserie handle 33 to be coupled to the handle 3 for an alternate cooking style. As shown in FIG. 8, the stabilizer 14 is not disposed in a position for inhibiting movement between the arm retainer 31 and the arm 6. This configuration allows the rotisserie handle 33 to be rotated, which in turn rotates the telescoping arm 6 and a food cooking attachment connected to the arm 6 (shown as a food holding grill 18 in FIG. 8). FIG. 8 also shows the horizontal longitudinal axis 12 about which the camp grill 80 rotates in a rotisserie mode, and the vertical axis 114 about which the camp grill 80 can be pivoted in order to move the attachment coupled thereto toward or away from the heat source. FIG. 9 is a detailed exploded perspective view of a portion 120 of the camp grill 80 shown in FIG. 8 and including the rotisserie handle 33, the handle 3, and the arm 6. Simply by using handle threads 5 and rotisserie handle threads 37 a user can removable couple the rotisserie handle 33 to the handle 3. Also shown are handle threads 28 and telescoping arm 6 threads 2 that connect the telescoping arm 6 to the handle 3.

Figure 10:
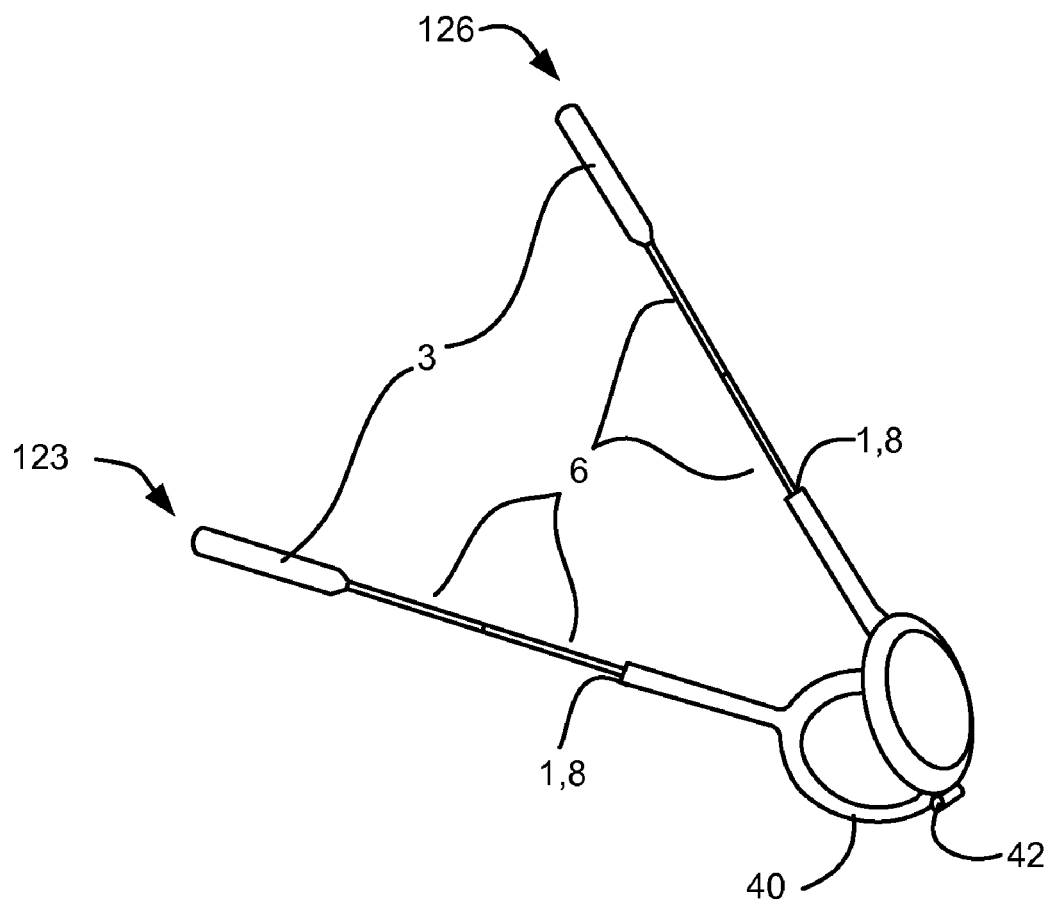
FIG. 10 is a perspective view of a telescoping pie iron configuration of the campfire cooking device in accordance with the present invention.

FIG. 10 is a perspective view depicting a pie iron 40. A hinge 42 enables two portions 123, 126 of the pie iron to move between an open condition and a closed condition. The telescoping arms 6 provide a pie iron configuration that is collapsible and reconfigurable for multiple uses. The telescoping arms 6 can be removed by twisting and reconfiguring them into other cooking applications such as the embodiments and applications explained in this disclosure. The handle 3 is removable, as previously disclosed and includes the rotisserie attachment means built in.

Figure 11:
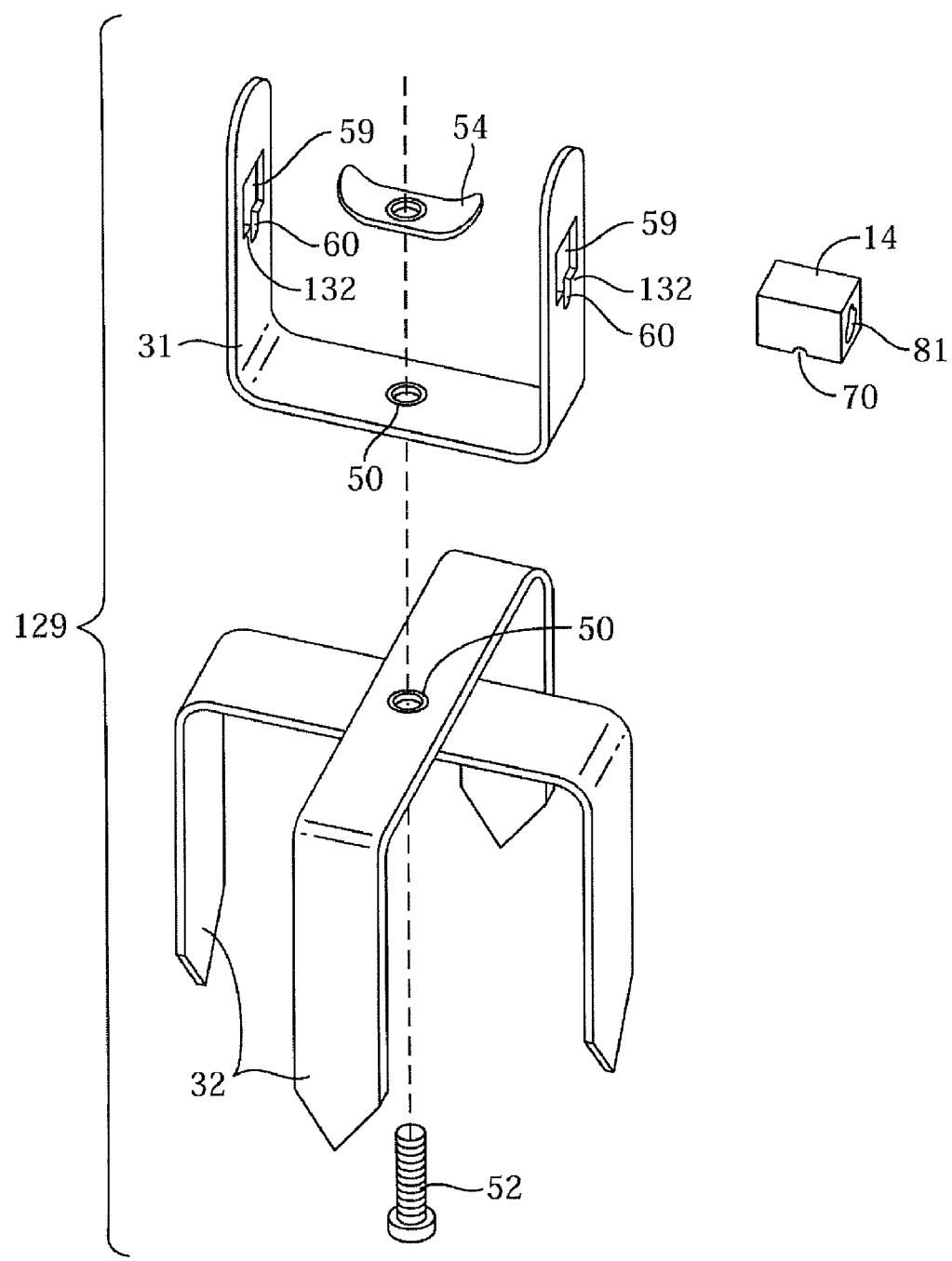
FIG. 11 is an exploded perspective view illustrating the positionable arm stabilizer in accordance with the present invention.

FIG. 11 is a detailed exploded perspective view of a stabilizing assembly 129 including stabilizing arms 32, which act as a foundation for the entire cooker when placed into or on the ground, and arm retainer 31. The arm retainer 31 is pivotally coupled to the stabilizing arms 32 by the wing nut 54 and the bolt 52. The stabilizer 14, when placed on the telescoping arms 6, is configured to fit through openings 59. A groove or slot 70 on a lower surface of the stabilizer 14 has structure that is engaged by an edge 132 of the openings 59. With the stabilizer 14 disposed in the through openings 59, the stabilizer 14 and the arm 6 is inhibited from rotation about the longitudinal axis. However, when a user moves the stabilizer 14 out of the through opening 59, the arm can fall into slot(s) 60 where it is free to rotate about its longitudinal axis. In any case, the structure on the stabilizer interfaces with the structure of the openings 59 in the arm retainer 31 to prevent or at least inhibit inadvertent movement of the stabilizer 14 out of the openings 59. Due to the rectangular configuration of the stabilizer 14, the stabilizer is inhibited from rotational movement in the openings 59. Other structures for the stabilizer 14 and openings 59 may inhibit relative movement without limitation.

The arm retaining hole 81 is configured for receiving the telescoping arm 6 so that telescoping arm 6 can rest in the arm retaining hole 81. As described above, the arm retaining hole 81 may have a non-circular configuration to inhibit rotational movement between the arm 6 and the arm retaining hole 81. For example, the arm retaining hole 81 may have the keyway 13 therein and the arm 6 may have a protrustion 92 (FIG. 2) thereon to engage in the keyway 13. The stabilizing arms 32 may be pointed enabling the unit to be more easily pushed into the earth, snow, wood, or any other surface.

It is to be understood that the terms, "apparatus", "campfire cooking device", "camp grill", and "camp cooker" all refer to an apparatus in accordance with the same general principles of the invention although the details of the various embodiments may vary. A camp cooker that enables adjustment of its configuration allows a variety of associated benefits. The configurations include a first condition in which the camp cooker may be compacted to fit more readily in a back pack or other packing device, and a second condition in which the camp cooker may have the positional or telescopic arm or arms, handle or handles in an elongate deployed condition in which one or more of the components are telescoped relative to one or more other components such that the camp cooker forms a more typical camp cooker configuration.

A portable cooking apparatus that is light, packable, compatible with back-country hiking, and that is multi-functional may be used in conjunction with any heat source that is typically utilized outdoors. The heat source may have a flame, hot coals, or another form of heat that is hot enough to prepare food. In general, an apparatus in according to embodiments of the invention may have an arm 6 that is capable of being elongated and shortened generally horizontally with an attachment system on the arm that enables selective attachment of a plurality of food and drink holding attachments. Additionally, that attachments may be coupled to each other and/or to a strap connected to the handle 3.

The handle 3 may include a hand grip for holding the device. The handle can have a compartment that can be used for holding parts of the device in a disassembled and stowed condition. Other articles such as matches, fish hooks, and the like may be stored in the handle. The device or apparatus may include a variety of attachments or may be adapted for a variety of functions such that the device or apparatus may form part of a system. Thus, in a dismantled state, the apparatus may form a disassembled grilling system including the telescoping arms.

A rotisserie cooking mode can be utilized to rotate food over an open flame. A rotisserie handle 33 can be releasably coupled to the handle 3 or hand grip. The rotisserie handle 33 can be moved to a locked condition to inhibit rotation generally about a longitudinal axis of the arm 6 in a variety of cooking positions. A pivoting arm stabilizer enables the cooking food to be horizontally pivoted generally about a vertical axis away from or onto the heat source.

Embodiments of the present invention have been developed to provide a cooking device with one or more handles which a user manipulates with his or her hands to hold the cooker and in which the said handle or handles at a proximal end of the cooking device may be adjusted in their length or distance from a distal extent of the cooking device to contract a longer length to a shorter length and create a more pack friendly cooker.

The cooking device may include two arms that have a long and slender configuration, and a handle 3 that may include a wood hand grip or other material serving as the hand grip. On the end of each arm 6 the hand grips may be attached or formed together with the construction of the arms. On an opposite or distal end of the cooking device from the proximal hand grip area of each arm 6, there may be two portions coupled to a pivot and/or hinge. The two portions may consist of iron, aluminum, ceramic, plastic, and or anything suitable to be used in high temperatures and retain food for heating and cooking. The two said portions are made up of heat resisting FDA approved material and are manufactured in such a way as to hold any variety of food ingredients including any number of food ingredient shaping configurations. The two portions and the pivot or hinge are configured to enable a clamping action to hold food between the portions.

In some embodiments the cooker may have one arm with a pivot and two portions moving about the pivot. The pivot may have a vertical axis that enables a user to rotate a second portion having an attachment and food by manipulating a first portion on an opposite end of the camp cooker relative to the pivot. Using one arm allows for a lighter cooker and one that is easier to manufacture. One arm construction of a cooker or pie iron may also be easier to hold by the user.

Some embodiments of the present invention include a telescoping mechanism allowing the one arm or two arm constructed cookers to be lengthen and shortened according to the specific need. The telescoping features may be configured to have multiple sections that slide out of one another during the lengthening process. When an arm needs to be shortened, the sections slide inside one another in a retracting or shortening manner for customizing the length of the arm(s).

Another embodiment of the present invention is a cooker that folds itself on pivots. One or more sections may pivot and fold forming shorter length cooker. The folds or pivots may be located on the arm or handle in which the cooker may be folded to a more compact size.

Other embodiments of the present invention include detaching food holding attachment portions that can be quickly attached and removed, enabling coupling of a different food cooking configurations. Such a system enables utilization of multiple cooking attachments with a single device or system. These attachments may include, but are not limited to grill cooking attachments, sandwich cooking attachments (sliced bread), Pie cooking attachments, cake cooking attachments, dutch oven cooking attachments, pop-corn popper attachment, foil dinner holding attachment, corn cooking attachment, meat and poultry attachment, omelet and other egg cooking attachments, liquid containing attachments (bowl), namely soup, and as many attachments to fit the specific food cooking and water boiling need as necessary.

Some embodiments of the present invention include cooker retaining devices which stabilizes one or more armed camp cooker configurations over the heat source and enable the user to free his or her hands, so that the user is not required to hold the device over the heat source. The cooker stabilizer can also be used with many other pie irons and camp cookers currently available to consumers. The stabilizer may also be used to stabilize different food containing portions such as soup so that the cooker may also be used as a serving spot for the prepared food. The stabilizer may also pivot allowing the arm holding the food attachment to move in out of the heat source.

In some embodiments, any of the food retaining portions may include an attachment mechanism to accept food manipulating devices, including indenting tools, cutting tools, shaping tools, flavor adding apparatuses, and any such thing that changes shape or flavor of the food and that is to be held by one of the cooking attachments.

The Figures included herewith are generally diagrammatic. Thus, together with the description herein, the several step and operations of embodiments of a method have also been disclosed. Other steps and methods may be conceived that are equivalent in function, logic, or effect to one or more steps, or portions thereof, of the methods described herein. Additionally, the format and symbols employed in the Figures are provided to explain the apparatuses, systems and methods and are understood not to limit the scope of the method. Additionally, the order in which particular steps or operations occur may or may not strictly adhere to those disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable grilling device for cooking over a heat source, the device comprising:
    at least one horizontally extending positional arm changeable between a shorter setting and a longer setting, wherein the positional arm is longitudinally collapsible between the longer setting and the shorter setting, thereby having a variable length; and
    an adapter portion on a distal end of the positional arm that accepts any one of a plurality of releasably coupled food attachments and moves the food attachment toward and away from the heat source while a proximal end of the positional arm is maintained in a fixed location relative to the heat source.

2. The device of claim 1, further comprising a handle removably coupled to the positional arm.

3. The device of claim 1, wherein at least one positional arm is telescopic.

4. The device of claim 1, further comprising a stabilizing stand, wherein the positional arm is supported on the stabilizing stand for hands-free utility.

5. The device of claim 1, wherein the device has a plurality of telescoping arms.

6. The device of claim 5, wherein the telescoping arms are equipped to accept removably coupled attachments.

7. The device of claim 1, further comprising a handle adapted to be coupled to the at least one arm, wherein the handle has a compartment to hold the arm for easy compact storage.

8. The device of claim 7, further comprising a retention strap coupled to the handle, wherein the retention strap holds articles pertaining to the camp cooking device including cooking equipment.

9. The device of claim 1, wherein the device is part of a camp cooker system, the camp cooker system further including one or more attachments from a group comprising a sandwich sealing crust remover, a pot, a fork, a grill, a pie iron, and a Dutch oven, wherein each of the attachments are removably attachable to the at least one arm.

10. The device of claim 9, wherein the camp cooker system includes at least three of the attachments from the group.

11. A portable grilling device for cooking over a heat source, the device comprising:
    at least one horizontally extending positional arm changeable between a shorter setting and a longer setting, wherein the positional arm is longitudinally collapsible between the longer setting and the shorter setting, thereby having a variable length;
    at least one stabilizing assembly supporting the positional arm, the stabilizing assembly having a first pivot with an axis generally aligned with a longitudinal axis of the positional arm; and
    an adapter portion on a distal end of the positional arm that accepts any one of a plurality of releasably coupled food attachments and moves the food attachment toward and away from the heat source while a proximal end of the positional arm is maintained in a fixed location relative to the heat source.

12. The device of claim 11, wherein the stabilizing assembly comprises:
    at least one stabilizing arm for engagement on a supporting surface;
    an arm retainer; and
    a second pivot coupling the arm retainer to the stabilizing arms, the second pivot being on an axis transverse to the first axis.

13. The device of claim 12, wherein the axis of the second pivot of the stabilizing assembly enables at least one positional arm to pivot in a horizontal manner on and off the heat source.

14. The device of claim 11, wherein the stabilizing assembly is adapted to vertically raise and lower at least one positional arm in a vertical direction.

15. A portable grilling device for preparing food over a heat source, the device comprising:
    at least one positional arm having a proximal end and a distal end, wherein the positional arm is longitudinally collapsible between the longer setting and the shorter setting, thereby having a variable length;
    a handle removably attached to the proximal end of the positional arm;
    an arm retainer rotatably supporting the positional arm for rotation generally about a first longitudinal axis of the positional arm;
    at least one attachment removably attached to the distal end of the positional arm.

16. The device of claim 15, wherein the handle comprises a rotisserie handle.

17. The device of claim 15, wherein the handle is an arm handle, the device further comprising a rotisserie handle removably coupled to the arm handle.

18. The device of claim 17, wherein the arm handle is removably coupled to the arm, and the rotisserie handle is removably coupled to the arm handle.

19. The device of claim 15, wherein the positional arm is telescopic and comprises at least first and second portion that telescope relative to each other.

20. The device of claim 15, further comprising a stabilizing assembly, wherein:
    the arm retainer is part of the stabilizing assembly;
    the stabilizing assembly further comprises a pivot having a second axis that is transverse to the first longitudinal axis; and
    the positional arm is rotatable on the pivot to move an attachment toward and away from the heat source.

* * * * *

UNITED STATES PATENT AND TRADEMARK OFFICE
CERTIFICATE OF CORRECTION

PATENT NO. : 7,735,416 B2
APPLICATION NO. : 11/944584
DATED : June 15, 2010
INVENTOR(S) : Lane A. Ekberg Page 1 of 1

It is certified that error appears in the above-identified patent and that said Letters Patent is hereby corrected as shown below:

Column 1, Line 62
"length to length"---should read "length to a length"

Column 1, Line 67
"cam more easily"---should read "can more easily"

Column 2, Line 5
"is a attachment"---should read "is an attachment"

Column 2, Line 40
"The additional may be"---should read "The additional pivot may be"

Column 2, Line 59
"the embodiment of"---should read "the embodiments of"

Column 4, Line 48
"the two to parts"---should read "the two parts"

Column 7, Line 27
"an elongate deployed"---should read "an elongated deployed"

Column 7, Line 36
"an apparatus in according to"---should read "an apparatus according to"

Column 8, Line 30
"to be lengthen"---should read "to be lengthened"

Column 8, Line 44
"coupling of a different food"---should read "coupling of different food"

Signed and Sealed this

Seventeenth Day of August, 2010

David J. Kappos
*Director of the United States Patent and Trademark Office*